March 7, 1967 T. D. TRUITT ET AL 3,308,440

MEMORY SYSTEM

Filed Jan. 21, 1964 2 Sheets-Sheet 1

INVENTORS
THOMAS D. TRUITT
DONALD F. FRAIPONT

BY Allan Ratner

March 7, 1967 T. D. TRUITT ETAL 3,308,440
MEMORY SYSTEM
Filed Jan. 21, 1964 2 Sheets-Sheet 2

INVENTORS
THOMAS D. TRUITT
DONALD F. FRAIPONT
BY Allan Ratner

United States Patent Office
3,308,440
Patented Mar. 7, 1967

3,308,440
MEMORY SYSTEM

Thomas D. Truitt, Princeton, and Donald F. Fraipont, Princeton Junction, N.J., assignors to Electronic Associates Inc., Long Branch, N.J., a corporation of New Jersey Filed Jan. 21, 1964, Ser. No. 339,232
7 Claims. (Cl. 340—172.5)

Figure 1:
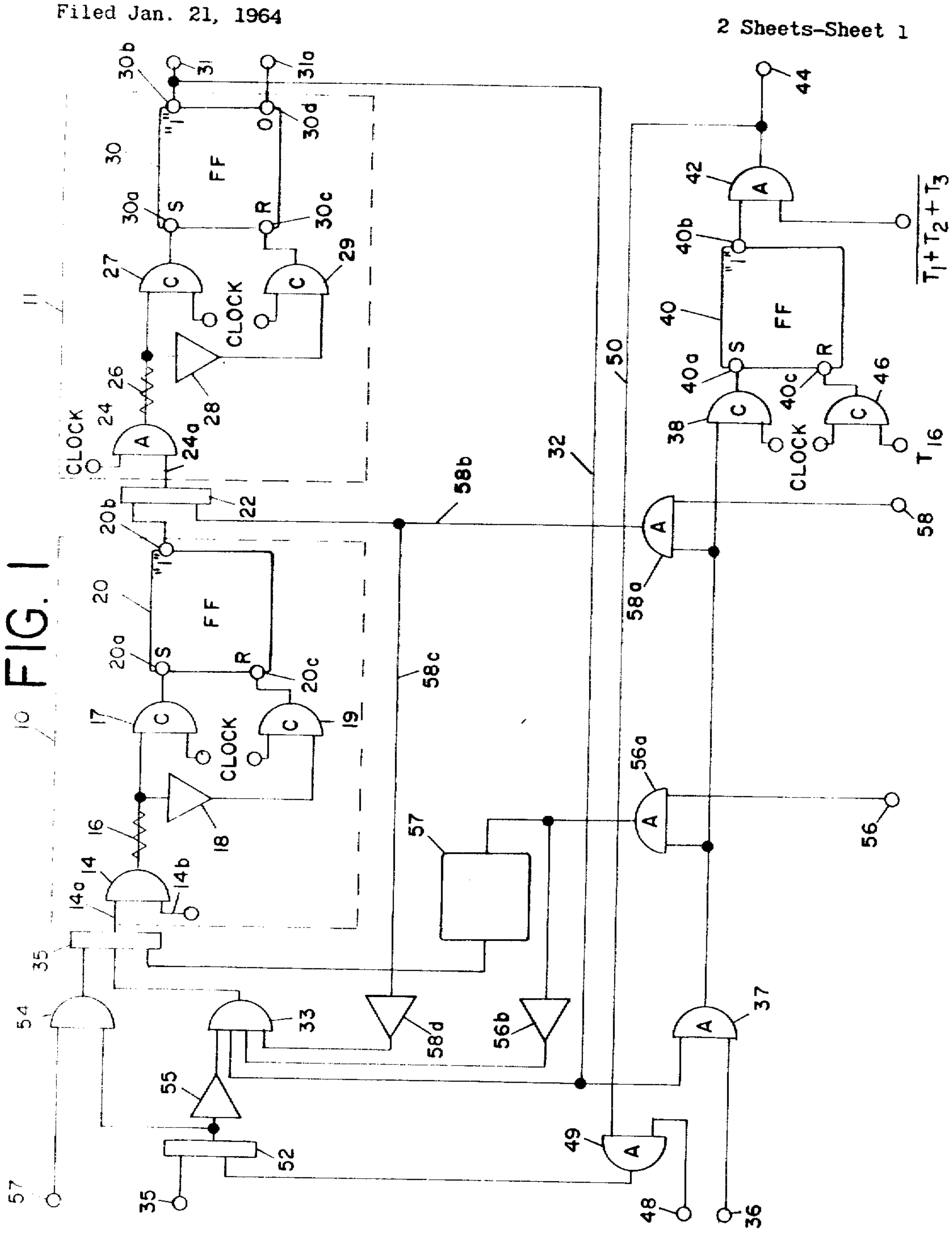

This invention relates generally to a memory system and more particularly to a serial memory unit for recirculating digital information.

Recirculating serial memory units are known in the art to provide both long-term and short-term storage of digital information in the form of words each having a predetermined number of bits. As described for example in "Computer Handbook," edited by Huskey and Korn, McGraw-Hill, 1962, at pages 16–12 et. seq., digital information is applied to an input of a delay line, the output of which is recirculated back to the delay line input. Some of these known serial memory units have included addressing means to provide for sequentially reading in and reading out desired words that are being recirculated. However, prior systems left much to be desired as they were structurally very complex, were quite costly, and did not provide an effective means for sequential data location.

Accordingly, an object of the present invention is a recirculating serial memory unit having simple means for sequentially reading in and reading out desired words.

Another object of the present invention is a recirculating serial memory unit in which previously identified digital words may be read out when desired.

In accordance with the present invention there is provided a serial memory unit which recirculates digital words and has provision for the inclusion of special identification bits or "flag" bits. Each of the words includes space for a plurality of flag bits and a predetermined flag bit may be introduced in any one or more of these spaces at desired word times. As the digital words appear at the output of the memory unit and are recirculated there may be read out those output words which contain a selected flag bit. In order to provide for this selection in accordance with the invention, there is provided a flag select circuit to which may be applied a flag select bit occurring only at the bit time of the desired flag. When a word appears at the output of the delay line which includes the desired flag bit an output signal is produced indicating that the word appearing at that output has been selected. Thus, a desired word may be selected and read out and the words sequentially following that word may also be read out in turn. In addition, there is provided write means responsive to the output signal to provide for the introduction of a new word during the word time of the selected word while preventing the selected word from being recirculated. In this manner, the memory system of the present invention provides a simple and effective means for data location in which desired words may be read in and read out.

In one form of the invention as the digital words are being recirculated, the flag bits which occur in the words may be selectively advanced or retarded from one word to the other. In addition, there is provided memory clock means for providing predetermined timing signals for each bit of each word and means for counting a predetermined number of words.

The invention may be better understood from the following detailed description of a representative embodiment thereof taken in conjunction with the accompanying drawings in which—

Figure 2:
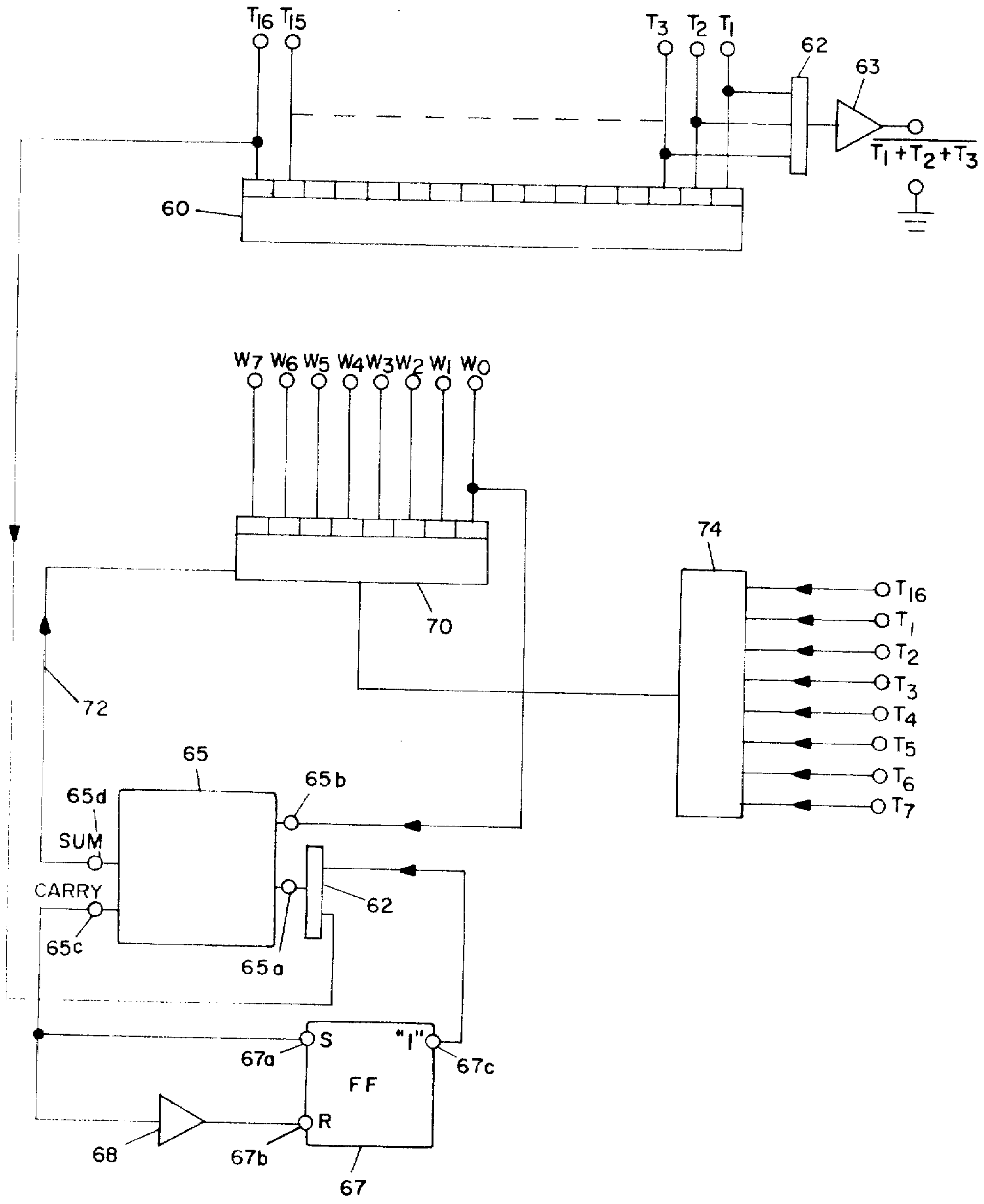

FIG. 1 illustrates schematically a typical memory system according to the invention; and FIG. 2 is a block diagram illustrating a memory clock means for the memory system of FIG. 1.

Referring now to FIG. 1 there is shown a memory system embodying the invention which may operate with sixteen-bit words and provide a total delay of two hundred and fifty-six words. It will be understood that the words being recirculated may have differing numbers of bits and that total delays other than two hundred fifty-six words may be provided all in accordance with the invention.

Using the above example of sixteen-bit words, it will be assumed that the first three bits of each word occur during times $T_1$–$T_3$ and these bits provide space for the flags. The remaining thirteen bits of each word comprise the data portion and occur between times $T_4$ and $T_{16}$ inclusive and the last bit $T_{16}$ may be utilized as a sign bit. It will be understood that each of the words follows a previous word and there is no time space between the words and the words are each comprised of the foregoing flag and data bits. It will also be assumed that the clock pulses occur in time at the end portion of each bit.

For the purpose of this description it will be assumed in binary notation that a logical signal "0" corresponds to a "0" state bit or "0" state output or second state signal, while a logical signal "1" corresponds to a "1" state bit or "1" state output or first state signal. It will also be understood that a first state signal may, for other examples, correspond to a logical signal "0" and a second state signal may correspond to a logical signal "1."

To provide the two-hundred-fifty-six-word delay, a delay circuit 10 may provide a one-word delay and a delay circuit 11 may provide a two-hundred-fifty-five-word delay. At the end of that total delay time of two hundred fifty-six words, each word is fed back into the input of delay circuit 10 and in this manner to recirculate the words for long-term storage.

The one-word delay circuit 10 includes an AND gate or circuit 14 having a first input **14*a* and a second input 14*b* connected to a source of clock pulses. The AND gate 14** is of the type well known in the art and provides an output in a "1" state only when both inputs thereof are in a "1" state. Since the "1" state clock pulses occur toward the end portion of each bit, it will be understood that an output in a "1" state from the AND gate is produced only during the time of the clock pulse.

The output of gate 14 is connected by way of a delay line 16 which may be of the magnetostrictive type and which provides a delay of one word less one bit, i.e., a fifteen-bit delay. That delayed digital information is applied to one input of a first charge gate 17 and by way of an inverter 18 to an input of a second charge gate 19. The charge gates are of the type described and claimed in an application Serial No. 213,633, filed July 31, 1962, by Harold R. Greene, entitled, Charge Gate, and assigned to the same assignee as the present invention. Each of the remaining inputs of charge gates 17 and 19 are connected to the source of clock pulses. Each of the charge gates operates to provide a "1" state output signal at the termination of both the "1" state bit and the clock pulse applied to its input terminals. Thus, with a bit in a "1" state applied to the input of gate 17 there will be produced an output "1" state signal at the termination of the clock pulse occurring at that bit time. With the output of gate 17 connected to a set input terminal **20*a* of a flip-flop 20, that flip-flop will be set at the termination of the "1" state bit applied to charge gate 17. In this manner a "1" state output signal will be produced at a "1" state terminal 20*b* of flip-flop 20 during the next bit time for application to an input of an OR gate 22. During that next bit time a "0" state bit may be produced at the output of delay line 16, which results in the application of a "1" state bit from the output of inverter 18 which is applied to gate 19. Thus, at the termination of the foregoing bit time an output signal is produced from gate 19 which is applied to a reset terminal 20***c* of flip-flop 20 to reset that flip-flop.

From the above description it will now be understood that a bit applied to the input 14*a* of delay circuit 10 is delayed fifteen bits by delay line 16 and then delayed one bit by the flip-flop 20 to produce a total delay for circuit 10 of sixteen bits or one word.

The delay circuit 11 is identical to the delay circuit 10 except that a magnetostrictive delay line 26 provides a delay time duration of two hundred fifty-five words less one bit. Thus, in the manner previously described, words are applied to an input 24*a* of an AND gate 24, through delay circuit 26, and to an input of a charge gate 27. The output of the delay line 26 is also applied by way of an inverter 28 to an input of a charge gate 29. The remaining inputs of gates 27 and 29 are connected to a source of clock pulses. The outputs of gates 27 and 29 are respectively connected to set and reset terminals 30*a* and 30*c* of a flip-flop 30. Thus, for example, a bit in a "1" state applied to the input 24*a* is delayed two hundred fifty-five words less one bit. That "1" state bit is then effective to enable gate 27 so that upon application of a clock pulse at the termination of that bit time the flip-flop 30 is set to produce a "1" state output from terminal 30*b*. In this manner, the delay circuit 11 provides a total delay time duration of two hundred fifty-five words.

"1" state output terminal 30*b* of the flip-flop 30 and "0" state output terminal 30*d* are respectively connected to memory system output terminals 31 and 31*a*. In addition, the digital words appearing at output terminal 31 are recirculated by way of a conductor 32 to an input of an AND circuit 33. With a signal in a "0" state applied to a load line input terminal 35 it will be understood that the upper input terminal of the AND gate 33 is in a "1" state and it will be assumed for the purpose of the present description that the lower two inputs of that AND gate have also applied thereto signals in a "1" state. In this manner, the gate 33 is enabled so that the output of delay circuit 11 which is the output of the memory system may be recirculated through that gate and by way of an OR gate 35 to the input 14*a* of the one-word delay circuit 10.

It will be remembered that the first three bits in each word occurring at times $T_1$–$T_3$ are the flag bit times. It will be assumed that at least one word of the words being recirculated in the memory system includes a bit in a "1" state at time $T_1$, for example. If it is desired to locate that word, there is applied to a flag input terminal 36 a bit in a "1" state only at times $T_1$. In this manner at each time $T_1$ there is applied to an input terminal of AND gate 37 a bit in a "1" state to enable that gate. When a word being recirculated by way of conductor 32 contains a flag bit also at time $T_1$, then there is applied to the remaining input of gate 37 a "1" state bit to produce a "1" state output therefrom. That "1" state output is applied to an input of a charge gate 38 having its remaining input connected to the source of clock pulses. Thus, at the termination of that "1" state bit there is produced a "1" state output signal from gate 38 which is applied to an input terminal 40*a* of a flip-flop 40 to set that flip-flop. As a result a "1" state output terminal 40*b* provides a bit in a "1" state which is effective to enable an AND gate 42. The remaining input terminal of AND gate 42 is connected to a source of bits which provides a "0" state signal during times $T_1$–$T_3$ and provides bits in a "1" state during times $T_4$–$T_{16}$; such source will later be described in detail. Thus, even though AND gate 42 has been enabled at the termination of time $T_1$ by flip-flop 40, that gate does not provide a "1" state output until time $T_4$. At that time AND gate 42 provides a "1" state output which is maintained up to and including time $T_{16}$.

That output is applied to a flag data output terminal 44, the "1" state output of which indicates that between times $T_4$ and $T_{16}$ the data portion of a flagged word is being recirculated and that such flagged data portion may be read out from the output terminals 31 and 31*a*.

In order to reset the flip-flop 40 to its initial state at the termination of that flagged data portion, there is provided a charge gate 46 having an input terminal connected to a source of "1" state bits occurring at times $T_{16}$. With a remaining input to that gate being connected to a source of clock pulses, there is produced at its output, at the termination of time $T_{16}$, a "1" state signal which is applied to a reset terminal 40*c* of flip-flop 40 to reset that flip-flop. In this manner, at the termination of the flagged word with flip-flop 40 reset, a "0" state signal is produced at the flagged word output terminal 44.

In order to prevent a flagged word from being recirculated and to allow for the application of a new word in its place, a bit in a "1" state may be applied to terminal 36 at time $T_2$ for example, while a "1" state signal may be applied to write terminal 48 during a desired word time. The signal applied to terminal 48 is conducted to one input of an AND gate 49 thereby to enable that gate. During the time of the data portion of the flagged word the "1" state output signal is conducted from output terminal 44 by way of a conductor 50 to the remaining input of AND gate 49 to produce a "1" state output from that gate. That output is applied by way of an OR gate 52 to one input of an input AND gate 54 to enable that gate. In addition, the "1" state output from OR gate 52 is applied by way of an inverter 55 to the upper input of AND gate 33 thereby to disable that gate. With gate 33 disabled, the data portion of the flagged word being recirculated by way of conductor 32 is prevented from being recirculated. At that time a new data portion may be applied to an input terminal 57 which is conducted by way of a remaining input of enabled AND gate 54 and through OR gate 35 to the input 14*a* of delay circuit 10. In this manner with "1" state signals applied to both terminals 36 and 48 the data portion of a new word may be substituted for a flagged word.

It will also be understood that a new word may be selected to be read into the memory system by way of the input terminal 57 to replace a word being recirculated by simply applying to the load line input 35 a bit in a "1" state during the desired word time. That "1" state signal is effective by way of OR gate 52 and inverter 55 to disable AND gate 33 while at the same time to enable AND gate 54. The source of new words (not shown) may be connected to input terminal 57 and such sources are well known in the art and may, for example, be a tape machine.

There is additionally provided an advance flag signal which may be applied by way of an advance flag input terminal 56. This signal is conducted by way of a lead to one input of an AND gate 56*a*, the remaining input of which is connected to the output of AND gate 37. Thus, if a "1" state advance flag signal is applied to terminal 56 at time $T_1$ and a "1" state flag bit at time $T_1$ for example is applied to terminal 36 to enable AND gate 37 and in addition a recirculating word contains a corresponding flag bit at time $T_1$ then a bit in a "1" state is produced at the output of AND gate 56*a*. The "1" state output from AND gate 56*a* at time $T_1$ corresponds to a flag and is effective by way of an inverter 56*b* to disable AND gate 33 at time $T_1$ so that the recirculating flag bit is prevented from being conducted through gate 33. At the same time the "1" state output of gate 56*a* is delayed one word by a one-word delay circuit 57*a* so that a flag appears at time $T_1$ one word later.

In similar manner, a retard input terminal 58 is connected to an input of an AND gate 58*a* with the remaining input thereof being connected to the output of gate 37. Thus, with a flag bit in a "1" state being applied to terminal 36 at time $T_2$ for example and with a "1" state bit applied to terminal 58 also at time $T_2$ and with a recirculating word containing a flag bit at time $T_2$, the gate 58a is effective to produce a "1" state output also at time $T_2$. That "1" state bit at time $T_2$ is applied by way of conductors 58b and 58c and through an inverter 58d to the lower input of gate 33. Thus, gate 33 is disabled during time $T_2$ to prevent the flag from being recirculated to the input of circuit 10. However, the recirculating flag is applied by way of conductor 58b to an input of OR gate 22 so that the flag is effectively placed in a word one word ahead of its previous position.

Referring now to FIG. 2 there is shown a memory timing or clock means for the memory unit of FIG. 1. A sixteen-bit position ring counter 60 is provided which by the application of clock pulses is shifted bit position by bit position from right to left to produce the timing signals from $T_1$ to $T_{16}$. When the sixteenth bit position is reached at time $T_{16}$ that bit is recirculated to switch the first bit position at time $T_1$ for continuous recirculation of the timing signals. In this manner, at the extreme right-hand bit position of the counter 60 there is provided a bit in a "1" state at time $T_1$. A bit in a "1" state is produced at the second bit position at time $T_2$ and so on until a bit in a "1" state is produced at the extreme left-hand position at time $T_{16}$ for the last bit of a word. The bits occurring at times $T_1$–$T_3$ are each applied to an OR gate 62 the output of which is applied through an inverter 63 to provide the input signal $\overline{T_1+T_2+T_3}$ for AND gate 42 shown in FIG. 1. This signal corresponds to a source having a "1" state bit occurring during times $T_4$–$T_{16}$ inclusive and a "0" state logic signal occurring during times $T_1$–$T_3$ inclusive.

The output of the $T_{16}$ bit position is applied by way of an OR gate 62 to a lower input 65a of a half adder 65. A carry output 65c of the half adder 65 is applied directly to a set input terminal 67a of a flip-flop 67 and is also applied through an inverter 68 to a reset input terminal 67b of that inverter. In addition, a "1" state output terminal 67c of the flip-flop 67 is applied to the remaining input terminal of the OR gate 62. The upper input terminal 65b of the half adder 65 is connected to an output terminal of the least significant bit position of an eight-bit shift register 70.

Shift registers, ring counters and half adders are well known in the art and are described in detail in the text by Millman and Taub, entitled, "Pulse and Digital Circuits," McGraw-Hill, 1956 at pages 323–422 et. seq.

Upon appearance of a "1" state output bit at time $T_{16}$ to indicate the end of a first word, for example, a "1" state output signal is applied from the sixteenth bit position $T_{16}$ of the counter 60 through the OR gate 62 to input terminal 65a of the half adder. The remaining input 65b is in a "0" state and thus a "1" state output bit is produced at a sum output terminal 65d of the half adder 65 which is applied by way of a conductor 72 to the input of the most significant input bit position $W_7$ of the eight-bit shift register 70. Shift register 70 is shifted eight bit positions during the next succeeding word, i.e. the second word, by means of an OR gate 74 having applied thereto output signals from the bit positions $T_1$–$T_7$ and $T_{16}$ of the counter 60. In this manner, "1" state input bits are applied to OR gate 74 at times $T_1$–$T_7$ and $T_{16}$. Thus, at these times the register 70 is shifted for a total of eight bit positions and the "1" state bit that was applied to the most significant bit position $W_7$ is shifted to the right to the least significant bit position $W_0$ to indicate that a first word has occurred.

At time $T_{16}$ of the second word a bit in a "1" state is applied to the terminal 65a of the half adder and in addition a "1" state bit is supplied from the $W_0$ terminal to an input terminal 65b of the half adder. With bits in a "1" state applied to both input terminals of the half adder a bit in a "0" state is produced at the sum output 65d, while a bit in a "1" state is produced at a carry output 65c which outputs are in accordance with the truth table. The "1" state output from terminal 65c is applied to the terminal 67a of the flip-flop 67 to set that flip-flop.

At the termination of time $T_{16}$ the eight-bit shift register 70 is shifted one bit so that the "1" state bit in the $W_0$ position is shifted out leaving a "0" bit in that bit position. Thus at time $T_1$ of the third word the terminal 65b of the half adder 65 is in a "0" state while the terminal 65a is in a "1" state as a result of a "1" state output produced by the flip-flop 67. Thus, a "1" state output is produced at the sum output terminal 65d which is applied to the $W_7$ bit position of the shift register 70 and a "0" bit is produced at the carry terminal 65c. That "0" bit is effective by way of an inverter 68 to reset the flip-flop 67 to thereafter produce at output terminal 67c a "0" state bit.

The "1" state bit applied to the $W_7$ bit position of the register 70 is shifted seven bits between times $T_1$ and $T_7$ inclusive so that a "1" state bit appears at bit position $W_1$ and a "0" state bit appears at bit position $W_0$ and these states are maintained until the termination of the third word.

In manner similar to the operation described above at the termination of the third word a "1" state bit is applied to terminal 65a to produce at time $T_{16}$ a "1" state output at the sum output terminal 65d which is applied to the most significant bit position $W_7$ of the register 70. Thus, at time $T_1$ that "1" state bit is shifted into the bit position $W_7$ while the "1" state previously set in bit position $W_1$ is shifted one bit to $W_0$. The last-named "1" state output is applied to the terminal 65b and with the remaining terminal 65a in a "0" state a "1" state bit is produced at the sum output which is applied to the $W_7$ bit position of the register.

At the time of the next shift pulse the "1" state bit is shifted out of the $W_0$ position while a "1" state bit is shifted into both the $W_6$ and the $W_7$ bit positions. The remaining six shift pulses are effective to shift both "1" state bits so that they then appear in the $W_0$ and $W_1$ bit positions. In this manner during time of the fourth word, the $W_0$ and $W_1$ bit positions are in a "1" state to indicate that three words have occurred.

The foregoing operation continues for the succeeding words until the register 70 indicates a total of two hundred fifty-six words after which the register clears to zero automatically.

It will be understood that the output signals of the shift register, viz. $W_0$–$W_7$, may be utilized by those skilled in the art to provide for random addressing of the serial memory of FIG. 1. Thus, the $W_0$ output terminal may be applied to a time address comparator along with a desired word location.

There will now be described an example of the operation of the serial memory system as shown in FIGS. 1 and 2 when the memory system is clear of digital information; that is, all of the bits being recirculated are in a "0" state. In order to "initialize" the memory system and to begin reading in digital information at the first word time or word $W_0$, a flag bit at time $T_1$, for example, may be introduced at the first word time. To achieve this result, the output $T_1$ from the counter 60 may be connected to both input terminals 57 and 35 during the time of word $W_0$. In this manner a flag bit in a "1" state is introduced into the first word $W_0$ and that flag is recirculated with the first word.

When data is available, it is applied to the input terminal 57 and in order to introduce that data during the time of the first word, the $T_1$ output of the counter 60 is connected to the flag select input 36 and a "1" state input is applied to the terminal 48. Thus, when the $T_1$ flag bit is recirculated by way of conductor 32 the AND gate 54 is enabled in the manner previously described to allow the introduction of the input data during the time of the first word.

In addition at the time of the first word a signal in a "1" state may be applied to the advance flag terminal 56 so that the flag which occurred during the time of the first word is prevented from being recirculated and is thus "removed" from the first word and is introduced at time $T_1$ of the second word. In the above manner with data being introduced at the input terminal 57, that data may be read in during the second word time by application of a "1" state bit at time $T_1$ to input terminal 36 and a "1" state signal to the terminal 48. Thus, input data applied to the input of the memory system will be sequentially read in as a result of the provision of the flag select circuit which includes AND gates 37 and 42 and flip-flop 40, and the write circuit including AND gate 49.

It will be understood that at the termination of the two hundred fifty-sixth read in word, the flag will then appear in the first word so that the recirculating digital information may be sequentially read out by "flagging" the first word and then reading out that word as well as all subsequent words. It may be desired to have different words of the stored digital information include different flags when, for example, a particular function is characterized by thirty words and there are a plurality of such functions. In that event, as described above, a flag in a "1" state at time $T_1$ may be applied to the first word and by counting the number of words by means of the register 70 a "1" state flag at time $T_2$ may be read in at the time of the thirty-first word. From the foregoing it will be seen that digital information may be sequentially read in at desired times and that the digital information may be read out in a desired sequence.

Now that the principles of the invention have been explained it will be understood that many modifications may be made. For example, the one word delay circuit 57 may comprise a three-bit shift register (not shown) which is equal in number to the number of flag bits. The output of such shift register may be connected by way of an AND gate to the OR circuit 35. With such shift register being shifted by the flag bits and the flag bits also being applied to the remaining input terminal of that AND gate it will be understood that this circuit operates to effect a one word delay for applied flag bits. In addition, instead of requiring a separate one-word delay circuit 10 and a two-hundred-fifty-five-word delay circuit 11, these circuits may be combined into a single delay circuit (not shown) having a two-hundred-fifty-six-word delay line. Thus, the conductor **58*b* would be connected to a point on that delay line one word in from the beginning. Further, the total delay of the memory system may be only one word by using the delay circuit 10 alone without the delay circuit 11**.

What is claimed is:

1. A dynamic memory system for serially recirculating digital words arranged sequentially in time, each word being formed of a plurality of bits arranged sequentially in time, certain of said bits being flag bits, said system comprising:

means for delaying each of said words by a predetermined delay period, input means for selectively applying words and for selectively introducing predetermined flag bits at desired word times to an input circuit of said delaying means, means connected to an output circuit of said delaying means for sequentially recirculating said words to said input circuit, flag select means connected to said recirculating means and operable in response to the flag bits included in said words appearing at said output circuit for selecting for read out any word which includes a predetermined flag bit, said flag select means including means responsive to the correspondence in bit time of a flag bit included in a word and said bit applied to said flag select means for producing an output signal indicating that said word appearing at said output circuit is a selected word, and advance flag means connected to said flag select means and responsive to said output signal for advancing a flag bit from its bit position in a word to a corresponding bit position in the next succeeding word.

2. A dynamc memory system for serially recirculating digital words arranged sequentially in time, each word being formed of a plurality of bits arranged sequentially in time, certain of said bits being flag bits, said system comprising:

means for delaying each of said words by a predetermined delay period, input means for selectively applying words and for selectively introducing predetermined flag bits at desired word times to an input circuit of said delaying means, means connected to an output circuit of said delaying means for sequentially recirculating said words to said input circuit, flag select means connected to said recirculating means and operable in response to the flag bits included in said words appearing at said output circuit for selecting for read out any word which includes a predetermined flag bit, said flag select means including means responsive to the correspondence in bit time of a flag bit included a word and said bit applied to said flag select means for producing an output signal indicating that said word appearing at said output circuit is a selected word, and retard flag means connected to said flag select means and responsive to said output signal for retarding a flag bit from its bit position in a word to a corresponding bit position in the immediately preceding word.

3. A dynamic memory system for serially recirculating digital words arranged sequentially in time, each word being formed of a plurality of bits arranged sequentially in time, certain of said bits being flag bits, said system comprising:

means for delaying each of said words by a predetermned delay period, input means for selectively applying words and for selectively introducing predetermined flag bits at desired word times to an input circuit of said delaying means, means connected to an output circuit of said delaying means for sequentially recirculating said words to said input circuit, flag select means connected to said recirculating means and operable in response to the flag bits included in said words appearing at said output circuit for selecting for read out any word which includes a predetermined flag bit, said flag select means including means responsive to the correspondence in bit time of a flag bit included in a word and said bit applied to said flag select means for producing an output signal indicating that said word appearing at said output circuit is a selected word, advance flag means connected to said flag select means and responsive to an output signal for advancing a flag bit from its bit position in a word to a corresponding bit position in the next succeeding word, and retard flag means connected to said flag select means and responsive to an output signal for retarding a flag bit from its bit position in a word to a corresponding bit position in the immediately preceding word.

4. A recirculating serial memory system for sequentially reading in and reading out digital words, each of which is formed of a plurality of bits arranged sequentially in time, certain of said bits being identification bits, said system comprising:

means for delaying each of said words by a predetermined delay period, input means for selectively applying said words to an input of said delaying means, means connected to the output of said delaying means for recirculating said words from said output to said input, select means connected to said recirculating means and responsive to the identification bits included in said words appearing at said output, means for applying to said select means a bit occurring at the bit time of a desired identification bit for producing an output signal only when a word appears at said output which includes an identification bit occurring at that bit time thereby to provide an indication that said word appearing at said output has been selected, and advance means connected to said select means and responsive to said output signal for advancing an identification bit from its bit position in a word to a corresponding bit position in the next succeeding word.

5. A dynamic memory system according to claim 4 in which there is provided counter means for producing bits corresponding to each bit of each word, and adder means connected to said counter means for counting a predetermined number of words.

6. A recirculating serial memory system for sequentially reading in and reading out digital words, each of which is formed of a plurality of bits arranged sequentially in time, certain of said bits being identification bits, said system comprising:

means for delaying each of said words by a predetermined delay period, input means for selectively applying said words to an input of said delaying means, means connected to the output of said delaying means for recirculating said words from said output to said input, select means connected to said recirculating means and responsive to the identification bits included in said words appearing at said output, means for applying to said select means a bit occurring at the bit time of a desired identification bit for producing an output signal only when a word appears at said output which includes an identification bit occurring at that bit time thereby to provide an indication that said word appearing at said output has been selected, and retard means connected to said select means and responsive to said output signal for retarding an identification bit from its bit position in a word to a corresponding bit position in the immediate preceding word.

7. A recirculating serial memory system for sequentially reading in and reading out digital words, each of which is formed of a plurality of bits arranged sequentially in time, certain of said bits being identification bits, said system comprising:

means for delaying each of said words by a predetermined delay period, input means for selectively applying said words to an input of said delaying means, means connected to the output of said delaying means for recirculating said words from said output to said input, select means connected to said recirculating means and responsive to the identification bits included in said words appearing at said output, means for applying to said select means a bit occurring at the bit time of a desired identification bit for producing an output signal only when a word appears at said output which includes an identification bit occurring at that bit time thereby to provide an indication that said word appearing at said output has been selected, advance means connected to said select means and responsive to an output signal for advancing an identification bit from its bit position in a word to a corresponding bit position in the next succeeding word, and retard means connected to said select means and responsive to an output signal for retarding an identification bit from its bit position in a word to a corresponding bit position in the immediately preceding word.

References Cited by the Examiner

UNITED STATES PATENTS 3,017,610 1/1962 Auerbach et al. ----- 340—172.5
3,229,258 1/1966 Heibeck et al. ------ 340—172.5

ROBERT C. BAILEY, *Primary Examiner.*

R. M. RICKERT, *Assistant Examiner.*